United States Patent

Hanselmann et al.

Patent Number: 6,145,325
Date of Patent: Nov. 14, 2000

[54] METHOD FOR OPERATING A MOTOR VEHICLE AIR CONDITIONER WITH A COMPRESSOR WITH LUBRICANT CIRCULATION

[75] Inventors: Klaus Hanselmann, Jettingen; Dieter Heinle, Pluederhausen; Wolfgang Straub, Deggingen, all of Germany

[73] Assignee: DaimlerChrysler AG, Stuttgart, Germany

[21] Appl. No.: 09/272,379

[22] Filed: Mar. 19, 1999

[30] Foreign Application Priority Data

Mar. 19, 1998 [DE] Germany ............ 198 12 171

[51] Int. Cl.[7] .................................. F25B 43/02
[52] U.S. Cl. ................ 62/84; 62/192; 62/193
[58] Field of Search ................ 62/192, 193, 84

[56] References Cited

U.S. PATENT DOCUMENTS

| | | | |
|---|---|---|---|
| 3,088,291 | 5/1963 | Long | 62/192 |
| 3,738,118 | 6/1973 | Jacobs | 62/192 |
| 3,837,175 | 9/1974 | Miller | 62/192 |
| 4,606,197 | 8/1986 | Takahashi et al. | |
| 5,408,841 | 4/1995 | Fujiwara et al. | 62/192 |
| 5,435,144 | 7/1995 | Kalmbach | 62/84 |
| 5,842,354 | 12/1998 | Kawasumi et al. | 62/206 |
| 5,884,494 | 3/1999 | Okoren et al. | 62/126 |
| 5,884,497 | 3/1999 | Kishita et al. | 62/193 |
| 5,890,374 | 4/1999 | Lee | 62/471 |

FOREIGN PATENT DOCUMENTS

| | | |
|---|---|---|
| 37 43 407 | 7/1988 | Germany . |
| 38 21 834 | 1/1989 | Germany . |
| 38 22 465 | 1/1989 | Germany . |
| 38 43 924 | 7/1989 | Germany . |
| 38 43 924 C2 | 7/1989 | Germany . |
| 196 42 832 | 9/1997 | Germany . |
| 196 42 832 C1 | 9/1997 | Germany . |
| 60-36794 | 2/1985 | Japan . |
| 4-251163 | 9/1992 | Japan . |

*Primary Examiner*—William Doerrler
*Assistant Examiner*—Mark Shulman
*Attorney, Agent, or Firm*—Evenson, McKeown, Edwards & Lenahan, P.L.L.C.

[57] ABSTRACT

A method for operating a motor vehicle air conditioner includes starting a compressor, and lubricating the compressor with a circulating lubricant for at least a specified minimum lubricating time.

7 Claims, 1 Drawing Sheet

METHOD FOR OPERATING A MOTOR VEHICLE AIR CONDITIONER WITH A COMPRESSOR WITH LUBRICANT CIRCULATION

BACKGROUND AND SUMMARY OF THE INVENTION

This application claims the priority of German Patent Application No. 198 12 171.7, filed Mar. 19, 1998, the disclosure of which is expressly incorporated by reference herein.

The present invention relates to a method for operating a motor vehicle air conditioner with a compressor lubricated by circulated lubricant.

It is known that so-called externally regulated compressors can be used in motor vehicle air conditioners. The output of such compressors can be controlled externally in stages or varied continuously in order to set the air conditioner output to a desired value. In conventional air conditioners without the ability to regulate the output of the compressor, the air conditioner output is set by connecting and disconnecting the compressor cyclically in suitable fashion by a magnetic clutch or the like, in other words to a mechanical drive such as the vehicle engine. Such externally regulated compressors and methods for their control are described for example in German Patent DE 38 43 924 C2 and German Patent Application No. 196 42 832.7.

Such externally regulated compressors are also frequently lubricated with a circulated lubricant in the form of a suitable lubricating oil that is added to the coolant and is circulated with the coolant in the coolant circuit. A sufficient lubricant supply is particularly important for externally regulated compressors that are connected without clutches to mechanical drives because they have mechanically movable parts turning constantly even without any demand for compressor output and at low outside temperatures.

It is also known that each time the cooling operation of motor vehicle air conditioners begins, there is a risk of so-called "flash fog" formation. When the system starts, the air stream guided over the still-wet evaporator surface becomes humidified and results in fog forming on the interiors of vehicle windows subjected to the flow. To avoid this effect, it is known that the air conditioner can be started in so-called reheat operation each time, in other words dehumidification operation. The coolant circuit is set for maximum cooling output, and the dry air cooled in this way is then heated suitably by a heating body. Depending on the actual cooling output requirement, after a certain amount of time, a gradual transition is made from reheat operation to the actually desired operating mode in systems with so-called internally regulated compressors (in other words those that are activated and deactivated by a clutch), wherein the compressor, which is constantly connected during reheat operation, is disconnected and connected alternately. The time intervals during which the compressor is disconnected is lengthened suitably.

The technical problem to be solved is the provision of a method in which a motor vehicle air conditioner that has a compressor lubricated by a circulated lubricant can be operated so that a lubricant supply is guaranteed that is always sufficient for the compressor.

The present invention solves this problem according to the following methods.

In a method according to the present invention, the compressor, after starting, is kept in the lubricant-circulating operating mode for at least a specified minimum lubrication time. By suitably specifying this minimum lubrication time, compressor operating times that are too short, which could result in an insufficient supply of lubricant for the compressor, are avoided. On the other hand, in a corresponding operating situation, maintenance of lubricant-circulating compressor operation for the minimum lubrication time can be combined after each new start with an initial reheating operation of the system to avoid the flash-fog effect. As a result of maintaining lubricant-circulating compressor operation for a suitably specified minimum lubricating time in the case of a lubricant that is added to the coolant as an additive, the lubricant is able to supply a sufficient quantity to lubricate the compressor, following a new start of the system and after being circulated in the coolant circuit.

In a method according to another embodiment of the present invention, the minimum lubrication time is advantageously specified to vary as a function of the outside temperature. Shorter minimum lubrication times are selected for higher outside temperatures than for lower outside temperatures. Since more water of condensation is formed during reheating operation with increasing outside temperature, the shorter minimum lubrication time for higher outside temperatures prevents the formation of quantities of water of condensation that are undesirably high.

In a method according to another embodiment of the present invention, the compressor is operated at maximum output at least during an initial part of the minimum lubrication time, with the flash-fog effect being counteracted. The compressor output is then gradually adjusted to a value required by the user. This gradual transition takes place in another embodiment of the present invention with a PT1 time response like that which can be achieved by using a conventional PT1 element.

Other objects, advantages and novel features of the present invention will become apparent from the following detailed description of the invention when considered in conjunction with the accompanying drawing.

DETAILED DESCRIPTION OF THE DRAWINGS

Figure 1:
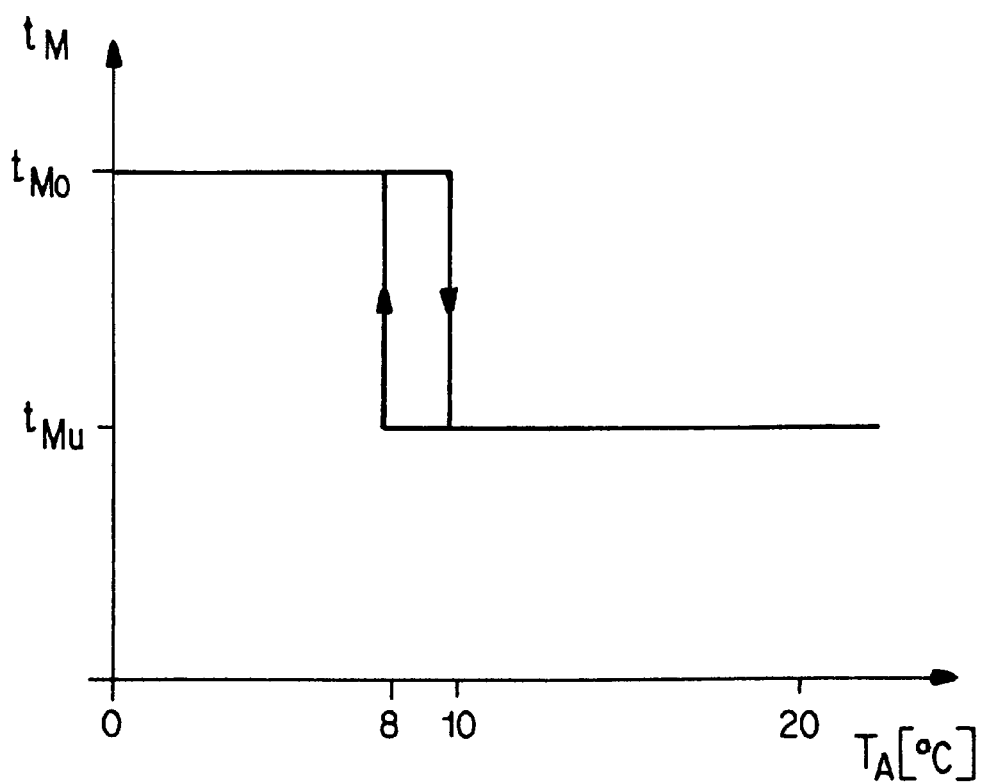
FIG. 1 shows a graph of the minimum lubrication time during which a compressor of a motor vehicle air conditioner lubricated by circulated lubricant, after starting, is kept in lubricant-circulating operation as a function of the vehicle outside temperature.
Figure 2:
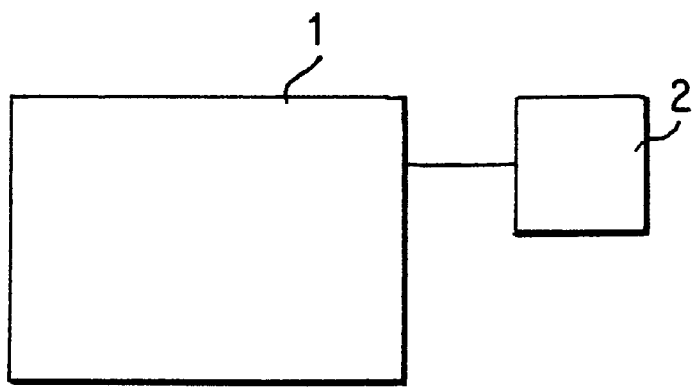
FIG. 2 is a schematic diagram showing a compressor whose transition is controlled by a PT1 element.

With the method according to the present invention, a given motor vehicle air conditioner that has a compressor lubricated by a circulated lubricant can be operated so that the compressor, following each new start of the air conditioner, is kept in the lubricant-circulating operating mode for at least a specified minimum lubrication time. Preferably, an externally regulated compressor is used as the compressor, wherein the compressor is lubricated with lubricating oil that is added to the coolant in the air conditioner and is circulated in the coolant circuit.

Because the compressor, after starting, is kept in the lubricant-circulating operating mode for at least the specified minimum lubricating time, the lubricating oil circulated in the coolant circuit is supplied in sufficient quantity to the compressor through the condenser, expansion valve, and evaporator of the air conditioner before the compressor is possibly deactivated or when the cooling power from the air conditioner is no longer required before the minimum period of time expires. This ensures that an externally regulated compressor without a clutch, whose mechanical parts run continuously even without any demand for compressor output and at low outside temperatures, is sufficiently supplied with lubricant.

Preferably, the minimum lubricating time is chosen variably as a function of the outside temperature, longer for lower outside temperatures than for higher outside temperatures. An embodiment of this kind is shown in the figure as a graph. In this example, a minimum lubrication time $t_M$ is selected which, in a lower range of outside temperatures $T_A$, is adjusted from less than 80° C. in this case to a higher value $t_{mo}$. In a higher outside temperature range from more than 10° C. in this case, the minimum lubrication time is set to a lower value $t_{mu}$. In the transitional range of the outside temperature TA between 8° C. and 10° C., a hysteresis is formed in the manner indicated by the direction of the arrows in the figure, in order to avoid undesired switching effects in the event of a slight overshooting of the respective range limit. As stated above, the hysteresis is chosen so that the minimum lubricating time $t_M$ changes from the higher value $t_{mo}$ to the lower value $t_{mu}$ when the outside temperature $T_A$ exceeds 10° C., while the minimum lubricating time $t_M$ changes from the lower value $t_{mu}$ to the higher value $t_{mo}$ only when the outside temperature $T_A$ falls below the value of 8° C.

For example, the lower value $t_{mu}$ for the minimum lubricating time $T_M$ could be 30 seconds and its upper value $t_{mo}$ could be 60 seconds. However, depending on the application, any other values could be set. Of course, the transition can always take place in the indicated range between 8° C. and 10° C. or in another range of outside temperatures $T_A$. Another alternative consists in specifying the minimum lubrication time $t_M$ as a multistage step function or as any other function, for example a constant function, as a function of the outside temperature $T_A$. Instead of the indicated one-step dependence of the minimum lubricating time $t_M$ on the outside temperature $T_A$, the minimum lubricating time $t_M$ may preferably decrease inversely with outside temperature $T_A$.

Several possible embodiments of this method will be described below in detailed implementation in a motor vehicle air conditioner that can be switched between cooling operation and non-cooling operation. This switch is also possible during non-cooling operation between fresh-air operation and air-circulation operation, as is known for motor vehicle air conditioners.

In general, provision is made for operation of air conditioners according to the present invention such that, after each new start or after manual activation of air conditioner operation for maximum dehumidification (for example by choosing a reheat operating mode or a defrost operating mode that is used for rapid elimination of window fogging), this system and hence the compressor are initially operated with maximum cooling power. By specifying the minimum lubricating time, oil circulation operation during this period of time is maintained in all cases for the compressor. The minimum lubricating time, as explained above in connection with the figure, is the minimum operating time required to maintain the internal lubrication of the compressor as a function of outside temperature. The compressor is kept in its lubricant-circulating operating mode during this minimum lubricating time even if before this period of time has expired, the cooling output requirement for the air conditioner is reset by a user. On the other hand, the initial oil circulating and reheat operation is kept as short as possible in order to keep the amount of condensate that precipitates on the evaporator in this operating mode as small as possible.

When using an externally regulated compressor, air conditioning output appropriate for requirements and hence a use-optimized air conditioning operation is possible in which a transition is made continuously, in other words gradually, from the initial oil circulation or reheat operation with maximum compressor output to the required regulating operation with minimum cooling output or with heat operation, so that no window fogging occurs. This transitional phase is produced by the fact that the control current to a regulating valve that is usually provided for the externally regulated compressor is successively reduced. The transition time is adjusted variably to the vehicle conditions, especially as regards the internal volume and the window area. Other influential parameters relevant for air conditioning can also be processed, such as the road speed, air volume, sun sensor signal, number of vehicle occupants for taking into account the moisture contributed by them, activated circulation operation, and/or air humidity information.

In an embodiment, a conventional PT1 element 2 is used to control the smooth transition from the initial oil circulation or reheat operation with maximum compressor output to the user-required air conditioner operating mode. After the minimum lubrication time has expired during the time constant T1 of this PT1 element, for example two minutes, a switch is made to the user-required operating mode. Even if during the minimum operating time, following a new start of the air conditioner, the user requests that the cooling output be switched off, the compressor 1 is kept operating for the minimum lubricating time. The reheat operating mode is increased by manual demand for air circulation operation by the length of the manually adjusted air circulation operation, at most however until the time for air circulation operation has expired. The PT1 damping member is also used following deactivation of the reheat and defrost operating modes for changing to a new operating mode.

In another embodiment, when the ignition is switched on, if the air conditioner is set to cooling operation, or after manually authorized activation of cooling operation for the specified minimum lubricating time, the compressor is kept operating at maximum output by setting the evaporator temperature at the minimum possible temperature for the air conditioner regulating unit in the air conditioner. After the minimum lubricating time has expired, the evaporator temperature setpoint is changed continuously by means of the PT1 element during the corresponding time constant of two minutes, for example, to the value associated with the cooling power requested by the user. Drying operation is only possible once while the ignition is switched on. If cooling operation is deactivated upon request from the user before the minimum lubricating time has expired, the compressor continues running nevertheless until the minimum lubricating time has expired. In the same way, the compressor operation for minimum lubricating time is maintained if the defrost operation is activated and then deactivated again before the minimum lubricating time has expired. When circulating air operation is switched on manually during drying operation, drying operation is maintained until the circulating air operation is terminated either manually or automatically.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a motor vehicle air conditioner, comprising:
   starting a compressor;
   lubricating the compressor with a circulating lubricant for at least a specified minimum lubricating time; and
   selecting the minimum lubricating time as a function of a temperature outside the motor vehicle.

2. A method according to claim 1, wherein the minimum lubricating time is increased as the temperature outside the motor vehicle decreases.

3. A method for operating a motor vehicle air conditioner, comprising:
   starting a compressor;
   lubricating the compressor with a circulating lubricant for at least a specified minimum lubricating time;
   operating the compressor at maximum output at least during a part of the minimum lubricating time; and
   then adjusting the compressor output to a value selected by a user.

4. A method according to claim 3, wherein adjusting comprises controlling a transition from maximum compressor output to a the compressor output selected by a user with a PT1 element.

5. A motor vehicle air conditioners comprising:
   means for lubricating a compressor with a circulating lubricant for at least a specified minimum lubricating time;
   means for operating the compressor at maximum output at least during a part of the minimum lubricating time; and
   means for adjusting the compressor output to a value selected by a user.

6. A motor vehicle air conditioner, comprising:
   an externally regulated compressor;
   a compressor coolant;
   a circulating compressor lubricant added to said compressor coolant;
   means for lubricating the compressor with the circulating lubricant for at least the minimum lubricating time; and
   a PT1 element for controlling a transition from a maximum compressor output to a compressor output selected by a user.

7. A method according to claim 1, further comprising heating air from the compressor at maximum output.

* * * * *